United States Patent Office 3,849,428
Patented Nov. 19, 1974

3,849,428
CERTAIN PYRIDINIUM CARBAMOYLOXY COMPOSITIONS
Victor A. Pattison, Tonawanda, N.Y., assignor to Hooker Chemical Corporation, Niagara Falls, N.Y.
No Drawing. Filed Jan. 12, 1973, Ser. No. 323,181
Int. Cl. C07d 31/44
U.S. Cl. 260—295 CA                     10 Claims

ABSTRACT OF THE DISCLOSURE

Compositions of the formula

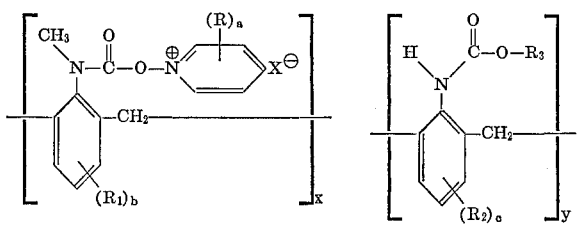

Such resinous compositions find utility in fabric treatment, are surfactants, in paper treatment and the like.

---

This invention relates to novel water-dispersible resinous compositions. More particularly, this invention relates to novel resinous compositions and the production thereof from components consisting essentially of (a) N-methyl anilines, (b) formaldehyde, (c) carbonic dihalides, (d) fatty alcohols and (e) pyridine N-oxides.

The resinous compositions produced in accordance with the present invention are water-dispersible and find utility in the treatment, in alkaline or acid conditions, of paper or paper products, textiles, as surfactants and the like.

The novel resinous compositions of the present invention are those of the formula

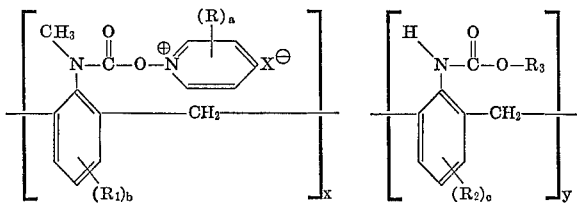

wherein R, $R_1$ and $R_2$ are organic radicals generally having from 1 to about 12 carbon atoms; $R_3$ is an alkyl radical, generally having from about 5 to 24 linear carbon atoms; X is halogen; $a$, $b$, and $c$ are numbers having a value of 0 or 1; $x$ is a number having a value of from about 1 to about 10 and $y$ is a number having a value of from about 0.8 to 4.

Exemplary of suitable R, $R_1$ and $R_2$ radicals are aromatic radicals such as phenyl, naphthyl, substituted phenyl, substituted naphthyl and the like; alkyl radicals such as methyl, ethyl, propyl, butyl, isopropyl, sec-butyl, hexyl, heptyl, nonyl, decyl, dodecyl and the like.

The molecular weight of the resins may vary from about 500 to about 2500, or higher.

Suitable carbonic dihalides are phosgene, carbonic dibromide and the like. Preferably, phosgene is the carbonic dihalide utilized.

Suitable N-methyl anilines for use in formulating the resinous compositions of the present invention include N-methyl aniline; 3,5-dimethyl N-methyl aniline; 4-dodecyl N-methyl aniline; 4-phenyl N-methyl aniline; 4-naphthyl N-methyl aniline; 3-(2-chloro) propyl N-methyl aniline; 3,4,5-trimethyl N-methyl aniline, and the like, as well as mixture thereof. The most preferred N-methyl aniline is the unsubstituted N-methyl anilines.

Suitable pyridine N-oxides for formulating the resinous compositions of the present invention include 3,5-dimethyl pyridine N-oxide; 3,5 - dipropyl pyridine N-oxide; 3-methyl pyridine N-oxide; 4-naphthyl pyridine N-oxide; 4-phenyl pyridine N-oxide; 3-hexyl pyridine N-oxide; 4-(3-chloropropyl) pyridine N-oxide and the like, or mixtures thereof. The most preferred reactant is unsubstituted pyridine N-oxide.

The formaldehyde employed may be obtained from such sources as aqueous solutions of formaldehyde, trioxane, paraformaldehyde, and the like. Preferably, the formaldehyde is used as an aqueous solution, about 37 percent by weight formaldehyde.

Suitable non-N-substituted anilines useful in preparing the resins of the present invention include 3,5-dimethy aniline; 3,5-dipropyl aniline; 4-phenyl aniline; 4-naphthyl aniline; 4-(4-chloro phenyl) aniline; 3-hexyl aniline; 4-dodecylaniline and the like, or mixtures thereof. The most preferred reactant is unsubstituted aniline.

The preparation of the novel resinous compositions of the present invention is carried out in a process comprising four principal steps or stages:

(a) N-methyl aniline, or substituted N-methyl anilines, or mixtures thereof are condensed with formaldehyde and a non-N-substituted aniline or mixtures thereof.

(b) The resin obtained from (a) is reacted with a carbonic dihalide to convert the N-methyl amino groups to carbamoyl halide groups and the amino groups to isocyanate groups;

(c) The resin of (b) is reacted with a $C_5$–$C_{24}$ alcohol linear at the isocyanate sites; and (d) The resin of (c) is reacted with pyridine N-oxide, substituted pyridine N-oxides, or suitable mixtures thereof to obtain the products of the present invention.

The reaction of the aniline compound, the N-methyl aniline compound and formaldehyde is conducted by adding the formaldehyde on a continuous basis to the aniline compounds in a system acidified to a low pH of a suitable mineral acid such as hydrochloric acid, the formaldehyde added in sufficient amounts to effect condensation of the anilines present. Following the addition of the formaldehyde, the reaction mixture is made alkaline by the addition thereto of a suitable alkaline agent, as for example, aqueous sodium hydroxide, a solid product separating. The liquid phase is removed by decantation, and the residue heated to remove any remaining water. The pH of the reaction system, during the addition of the formaldehyde, is generally maintained at 1 or less.

The temperature during the step (a) reaction is generally maintained at from about 100 to about 160° C., preferably from about 130 to about 160° C., with the time required to effect the condensation being on the order of from about 60 to about 90 minutes.

The reaction product of step (a) is then reacted with the selected carbonic dihalide, preferably phosgene, by adding a suitable solvent to the resin, heating to temperatures sufficient to remove any water present, cooling to less than about 35° C., and adding the carbonic dihalide continuously, in about stoichiometric amounts to react with the N-methyl amino groups, converting the groups to carbamoyl chloride groups, and the amino groups to isocyanate groups.

Heat is applied to move the temperature gradually up to about 150° C., evolving hydrochloric acid. The temperature is generally moved through a range of from about 35 to about 150° C. over a period of about 90 minutes. The solvent is removed by distillation, generally at about 120° C. under reduced pressures.

Suitable solvents include the halogenated hydrocarbons, such as chlorobenzene, dichlorobenzene and the like.

Generally the reaction is completed within a period of from about 90 to 120 minutes.

The product of step (b) is then reacted with the fatty alcohol by adding the alcohol, with stirring, to the resin in amounts sufficient to convert the isocyanate groups to carbamoyl ester groups, generally at a temperature of about 90° C., the reaction being essentially completed within a period of about 30 minutes.

The reaction product from step (c) is then reacted with the selected pyridine N-oxide by adding the pyridine N-oxide in about stoichiometric amounts, based on the carbamoyl halide groups present, stirring and allowing the reaction mixture to sand for about 2-8 hours, maintaining the temperature at ambient temperatures; however, the reaction may be conducted at elevated temperatures, on the order of about 90° C.

EXAMPLE 1

N-methyl aniline (257 parts by weight) is condensed with aniline (149 parts by weight) and formaldehyde at a pH of about 1 and at a temperature of about 130° C. The reaction product is added to dichlorobenzene and heated to remove water present. Phosgene is added to the reaction system, after cooling, and the temperature gradually increased to about 150° C. over a period of about 90 minutes. Following the removal of the solvent, 48.6 grams of the product and 32.5 grams of stearyl alcohol is heated at 90° C. for 120 minutes. The reaction mixture is dissolved in chloroform and added to a solution of pyridine N-oxide in chloroform (17 grams pyridine N-oxide in 102 grams chloroform). The reaction mixture is stirred for 60 minutes and on solvent evaporation, a water dispersible product is obtained.

What is claimed is:
1. A composition of matter having the formula

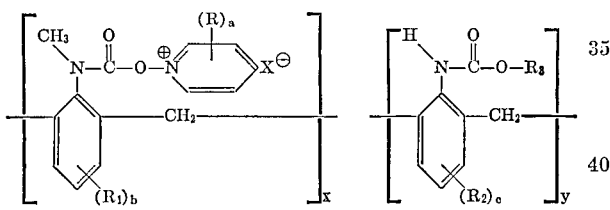

wherein R, $R_1$ and $R_2$ are alkyl having 1 to 6 carbon atoms or aryl having from 6 to 10 carbon atoms; $R_3$ is an alkyl radical having from 5 to 24 linear carbon atoms; X is halogen; $a$, $b$ and $c$ are numbers having a value of 0 or 1; $x$ is a number having a value of from about 1 to 10 and $y$ is a number having a value of from 0.8 to 4.

2. A composition as defined by Claim 1 wherein $a$, $b$ and $c$ are zero.
3. A composition as defined by Claim 1 wherein X is chlorine.
4. A composition as defined by Claim 1 wherein $R_3$ has 18 carbon atoms.
5. A composition as defined by Claim 1 wherein the ratio of $x$ to $y$ is about 1:1.
6. The process for producing compositions of matter of the formula:

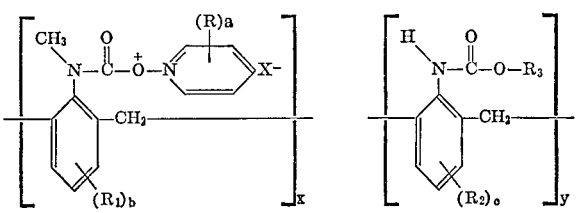

wherein R, $R_1$ and $R_2$ are alkyl having 1 to 6 carbon atoms; or aryl having from 6 to 10 carbon atoms; $R_3$ is an alkyl radical having from 5 to 24 linear carbon atoms; X is halogen; $a$, $b$, and $c$ are numbers having a value of from 0 or 1; $x$ is a number from about 1 to 10 and $y$ is a number having a value of from 0.4 to 8, which comprises (a) reacting, in essentially stoichiometric amounts, formaldehyde with an aniline of the formula

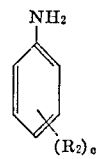

and an N-methyl aniline of the formula

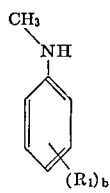

wherein $R_1$, $R_2$, $b$ and $c$ are as previously defined, for a time and at a temperature sufficient to essentially effect complete reaction;
(b) reacting therewith phosgene, in the absence of water;
(c) reacting the product of (b) with a fatty alcohol having from 5 to 24 linear carbon atoms, and
(d) reacting the reaction product of (c) with a pyridine N-oxide of the formula

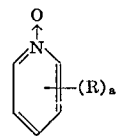

wherein R and $a$ are as previously defined.
7. The process as defined by Claim 6 wherein X is chlorine.
8. The process as defined in Claim 7 wherein, $a$, $b$ and $c$ are zero.
9. The process as defined in Claim 8 wherein $R_3$ has 18 carbon atoms.
10. The process as denfied by Claim 9 wherein $x$ is about 6 and $y$ is about 4.

References Cited

Karrer: Organic Chemistry, 4th Eng. Edition, Page 928, Elsevier Pub. Co. (N.Y.) 1950.

ALAN L. ROTMAN, Primary Examiner

U.S. Cl. X.R.

260—295 Q, 295 F, 77.5 R, 77.5 Q; 8—116.2; 117—154, 155 R; 106—270

UNITED STATES PATENT OFFICE
CERTIFICATE OF CORRECTION

Patent No. 3,849,428  Dated November 19, 1974

Inventor(s) Victor A. Pattison

It is certified that error appears in the above-identified patent and that said Letters Patent are hereby corrected as shown below:

Column 1, line 24, "are" should be---as---.
Column 2, line 1, "Sutiable" should be---Suitable---.
Column 2, lines 30 and 31, "alcohol linear" should read---linear alcohol---.
Column 2, line 38, "of" should be---by---.

Signed and sealed this 13th day of May 1975.

(SEAL)
Attest:

RUTH C. MASON
Attesting Officer

C. MARSHALL DANN
Commissioner of Patents
and Trademarks